Jan. 31, 1939.  C. G. VOKES  2,145,535

FILTER

Filed Jan. 25, 1937

INVENTOR
Cecil G. Vokes
BY
ATTORNEY

Patented Jan. 31, 1939

2,145,535

UNITED STATES PATENT OFFICE 2,145,535

FILTER

Cecil Gordon Vokes, London, England

Application January 25, 1937, Serial No. 122,273
In Great Britain August 13, 1936

2 Claims. (Cl. 210—164)

The invention relates to filters.

It is an object of the invention to provide an improved filter in which undue rise in the pressure of fluid supplied to the filter, due, for example, to clogging of the filter medium, is able to open up an alternative path whereby the fluid may by-pass the filter element.

It is a further object of the invention to provide a filter having a filter unit comprising filtering medium confined within a casing, the unit being movable as a whole under the pressure of fluid supplied to the filter, against the action of a spring, to enable the fluid to by-pass the unit.

A further object of the invention is to provide a filter unit comprising filtering medium confined within a casing having a reticulated wall, the filtering medium being interposed between the reticulated wall and an inlet opening which communicates with a reticulated tube which projects outwardly from the unit.

A still further object of the invention is to provide a casing for a filter having two similar open-ended portions which are urged toward each other, with the interposition of a ring which has in its opposite faces grooves which are substantially complementary to the edges of the similar portions at the adjacent open ends thereof.

With these and other objects in view, the invention consists in the improved combinations and arrangements contained in the embodiments now to be described in detail, novel features of which are set out in the claims which follow.

Figure 1:
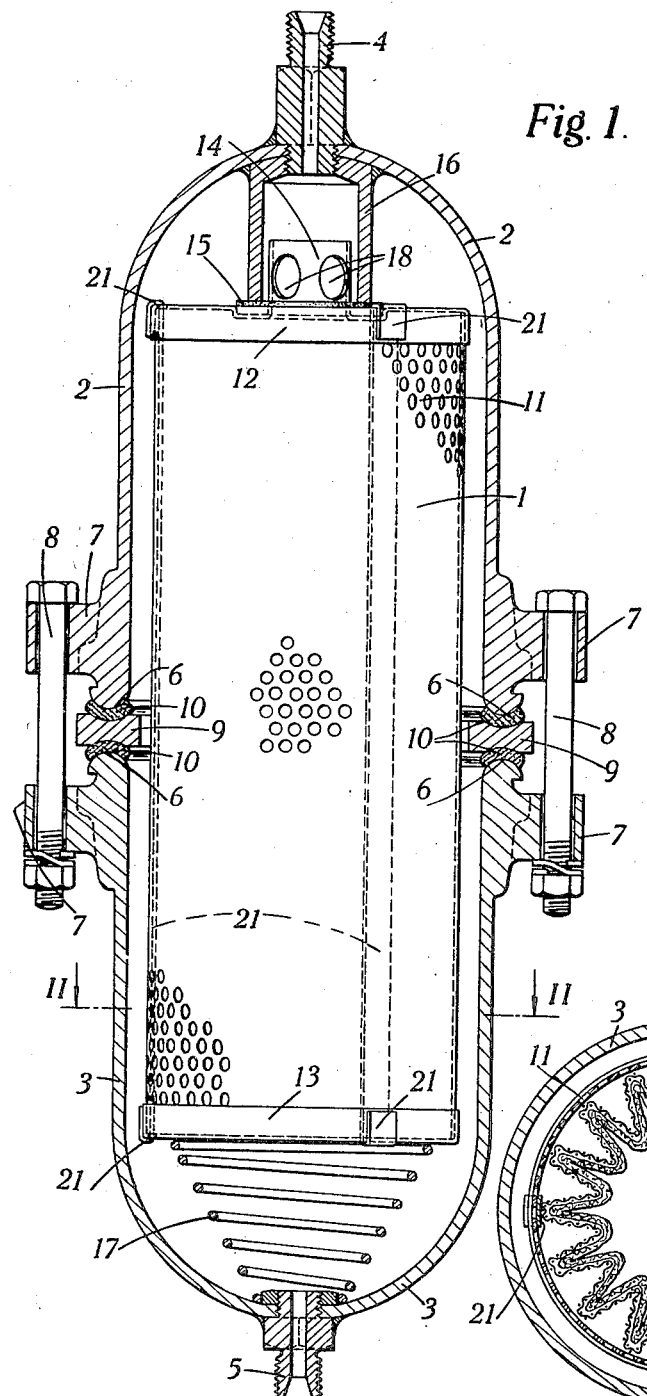
Figure 1 is a sectional elevation of the filter.
Figure 2:
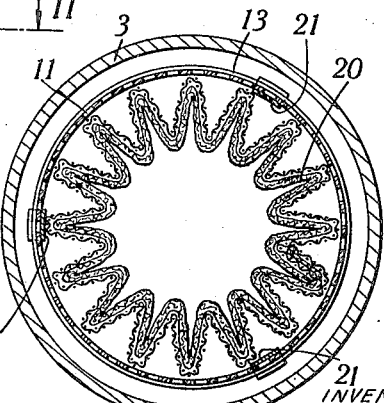
Figure 2 is a section on the line II—II of Figure 1.

The filter comprises a filter unit 1 mounted within a metal casing which consists of two similar parts 2 and 3 detachably secured together and has coaxial inlet and outlet passages formed in nipples 4 and 5 respectively. The nipples are threaded as shown and may be used to connect the filter in a fluid lead in any position.

The parts 2 and 3 have each a cylindrical portion and a closed end of domed form, the other ends being open. The domed ends are bored axially to receive the nipples 4 and 5.

At its open end, each of the parts 2 and 3 is formed to present, in the axial direction, a rounded edge 6 of circular form and radially projecting lugs 7 are provided on the outer surface of each part adjacent to the open end. The lugs on each part are bored to receive bolts 8 by means of which the two parts are drawn towards each other axially in assembly.

The casing assembly is completed by a metal ring 9 which has on each of its opposing faces a groove of mean diameter equal to that of the rounded edges 6, 6, the grooves being substantially complementary to those edges. This ring is positioned between the open ends of the two parts 2 and 3, with the intervention of thin cork washers 10, 10 which are pressed into the grooves by the rounded edges of the open ends of the two parts when nuts on the bolts 8 are tightened up against the lugs.

In this manner, the two parts of the casing are rigidly secured together with a liquid-tight joint.

The filter unit 1 comprises a star-shaped filtering wall 20 of a porous material, such as felt, with or without one or more layers of wire gauze, and a casing confining it the casing having a cylindrical wall 11 of perforated metal and a pair of metal end caps 12 and 13. The end caps are secured in position by means of strips 21 which are passed through apertures in the respective caps and bent over at the ends as shown.

The end cap 13 completely closes its end of the casing of the filter unit whilst the end cap 12 carries a short coaxial outwardly projecting inlet tube 14, which has a reticulated wall and communicates with the interior of the space defined by the star-shaped filtering wall. A cork washer 15 surrounds the base of the tube 14 and is partly received within a concentric recess provided in the cap.

As will be seen from the drawing, the filter unit is of less length than the outer casing of the filter and is of such diameter as to fit therein with considerable clearance.

The inlet passage of the casing communicates, on the inside, with a short coaxial tubular member 16, rigidly carried by the part 2 of the casing. This member 16 receives, with but little clearance, the short tube 14. A coil spring 17 confined between the end cap 13 and the domed outlet end of the casing, is provided to urge the filter unit towards the inlet end of the filter, the cork washer 15 being pressed into contact with the edge of the free end of the tubular member 16.

In use, oil enters the filter by the inlet passage, normally passing to the interior of the filter unit and through the filtering wall to the space between the unit and the outer casing, whence it may escape by way of the outlet passage.

Should the pressure of the oil on the inlet side of the filter rise unduly, owing, for instance, to blocking of the filtering wall, the filter unit is moved as a whole against the action of the spring 17, when oil may by-pass the filtering wall, passing directly from the inlet passage to the space outside the filter unit by way of the reticulation 18 in the wall of the short tube 14.

Since the by-pass operates by rise of pressure and not by overflow due to rise of level, it will be seen that the filter can be effectively used in any attitude.

The above specific form of filter is described by way of example, and various modifications may be made without departing from the invention.

I claim:

1. A filter comprising a casing formed with inlet and outlet passages, a filter unit movable longitudinally of the casing, cooperating tubular inlet elements carried one by the casing and the other by the filter unit, the latter establishing communication between the inlet passage of the casing and the interior of the filter unit, and yielding means for normally holding the filter unit in sealing cooperation with the inlet element carried by the casing, the tubular inlet element carried by the filter unit having its wall formed with openings which, in the movement of the filter unit to interrupt the sealing cooperation between the tubular element carried by the casing and said filter unit, permits said openings to establish communication between the inlet passage and the interior of the casing beyond the filter unit to thereby serve as a by-pass.

2. A filter having an outer casing with inlet and outlet passages, a tubular element forming part of the inlet element of the outer casing, a filter unit comprising a filter medium confined within a shell loosely fitted within the outer casing, said shell including a perforated wall and a pair of end plates, one of said end plates being arranged to provide a sealing cooperation with the tubular element when the filter unit is at the limit of movement in one direction within the casing, the end plate designed for sealing cooperation with the tubular element being formed with a tube to establish communication between the inlet passage of the casing and the interior of the filter unit, with such tube formed with openings sealed against the casing when the filter unit is in sealing cooperation with the tubular element, and means to permit a yielding movement of the filter unit to interrupt said sealing cooperation with the tubular element and at the same time establish communication through said openings in the tubular element between the inlet passage of the casing and the interior of the casing exteriorly of the filter unit.

CECIL GORDON VOKES.